Patented May 12, 1942

2,282,785

UNITED STATES PATENT OFFICE 2,282,785

STABILIZED EMULSION OF VITAMIN CONTAINING VEGETATIVE MATERIALS IN MOLASSES

Sidney Musher, New York, N. Y., assignor to Musher Foundation Incorporated, New York, N. Y., a corporation of New York No Drawing. Application April 22, 1940, Serial No. 330,985

11 Claims. (Cl. 99—153)

The present invention relates to the production of stabilized emulsions of vitamin containing wheat germs and similar products in molasses and also to the stabilization of those products against rancidity and other forms of oxidative deterioration, and particularly to the stabilization of their substantially water insoluble readily oxidizable constituents.

In accordance with the present invention, the cereal germs are dispersed in a relatively large quantity of blackstrap molasses, preferably over 70% of molasses and 30% of the germ.

It has been found particularly desirable to utilize for the purposes of the present invention the blackstrap molasses which is the uncrystallized fraction remaining in the manufacture of cane and beet sugars. Although blackstrap molasses is the desired product, there may also be employed sorghum molasses and, less preferably, refinery molasses.

Wheat germ may, for example, be dispersed in blackstrap molasses, utilizing 10% to 40% of wheat germ and the balance of molasses. Preferably the wheat germ is divided or milled to a fine state of division so that the molasses constitutes the aqueous continuous phase and the germ the discontinuous or disperse phase.

It has been found particularly desirable following the dispersion of the germ in the molasses, for the combination to be subjected to an elevated temperature treatment in excess of about 200° F. and preferably at a pH of 4 to 6.9, whereby enhanced stabilization takes place. For example, the combination of wheat germ and blackstrap molasses may be adjusted by the addition of an acid to pH 5.0 and then heated to 200° F. for 30 minutes. The finished product may, where desired, be further concentrated or dried and will be substantially stabilized against oxidative deterioration.

Moreover, the vitamins originally contained in the germ, particularly the water insoluble and molasses insoluble vitamins, will also have been substantially stabilized against deterioration.

It is also possible for the wheat germ to be dispersed in diluted aqueous blackstrap molasses but the germ should be dispersed in at least 3 to 4 parts by weight of the molasses. The heating of the slightly acidified combination enhances the stabilizing action of the molasses on the cereal germ, but even without the heat treatment, a definite stabilizing effect is obtained.

It is desirable for the germ to be in finely divided condition when dispersed in the blackstrap molasses so that the molasses occupies the continuous aqueous phase.

The wheat germ molasses combination must contain over about 50% of blackstrap molasses on its liquid weight basis against the solids weight of the germ and preferably contains as much as about 60% to 80% or more of the molasses liquid weight.

In some instances, the preparation may contain as little as 50% of blackstrap molasses. In order, however, to obtain a fully stabilized germ preparation which is stabilized both with respect to fat and protein decomposition as well as with respect to loss of the molasses insoluble vitamins, the finished product should contain over about 60% and preferably as much as 80% of blackstrap molasses on its liquid weight basis.

Following the heat treatment or as part of the heat treatment, the molasses germ combination may be subjected to a high temperature drying operation as by running in a thin stream or in ribbons or flakes on a moving belt and through a drying oven and desirably the drying should be conducted at a temperature over about 220° F. and preferably at a temperature of between 250° F. and 300° F. The combination may, for example, be run through an oven at between about 400° F. and 650° F. whereby further enhanced stabilization occurs.

In accordance with the present invention, the vitamins contained in the germs will be dispersed in the blackstrap molasses and substantially stabilized against deterioration and at the same time stabilized against rancidity. The finished product which will contain over about 60% to 80% or more of blackstrap molasses may be utilized for bakery purposes, in the manufacture of confectionery products and in feeding materials where this stabilization is particularly desired.

The wheat germ may be ground to about 25 mesh or more before incorporating in the molasses.

It is particularly important for the molasses that is used in accordance with the present invention to be substantially free of any yeasts or fermenting organisms. After the wheat germ has has been combined with the molasses, it is desirable that fermentation not be permitted to proceed but that both the germ and the molasses be retained in substantially their original condition.

Where the wheat germ molasses combination is too heavy or viscous to be utilized in its emulsified condition, a small amount of water or other aqueous material may be added to obtain proper consistency.

It is particularly desirable for the combination to be run through a colloid mill or other similar equipment which will finely disperse the wheat germ or other cereal germs in the molasses. The molasses wheat germ combination may be subjected to the elevated temperature such as to over 200° F. while being run through the colloid mill or other dispersing machine. The effecting of a fine and complete dispersion of the wheat germ in the molasses particularly at the elevated temperature produces the desirable enhanced stabilizing action.

Where desired, there may also be added to the molasses germ combination a small amount of a phosphatide, such as of lecithin. The lecithin may be dispersed in the combination and thoroughly admixed therewith and preferably the finished mixture is subjected to over about 200° F. in order to produce an enhanced stabilizing action.

Together with on in lieu of wheat germ, it is also possible to utilize other cereal germs and embryos, including corn germ, oat germ and rice germ. There may also be employed such other germs and embryos as peanut germ.

There may also be stabilized in accordance with this invention the various polishes and particularly where those polishes are substantially high in vitamin content and where oxidative decomposition presents an important problem. Among the polishes that may be used are included rice polish, oat polish, cacao polish and peanut redskins or peanut polish, which materials may or may not contain a portion of the bran removed along with the polishings.

Any of these products may first have been subjected to expression or solvent extraction to remove a part or all of the glyceride oil content contained therein but this invention is particularly directed to those products where the full natural oil content is retained.

Together with or in lieu of the germs, other vitamin containing vegetable materials may also be stabilized and particularly those which are substantially high in water insoluble carotene or pro-vitamin A.

For example, the water insoluble vitamins contained in the forage legumes or forage grasses including alfalfa, red clover, spring vetch, winter vetch and soya beans, and particularly their leaves and stalks, and also contained in the leaves and stalks of the cereal grasses such as of maize, sorghum, rye, oats, June grass and timothy may be stabilized by dispersing and and particularly their water insoluble solids in a substantially large amount of molasses.

These grasses are preferably finely divided and it is desirable that they be first subjected to dehydration by blowing a stream of air heated to about 1000° F. to 1500° F. through them until their moisture content is reduced to under about 20%. This very high temperature treatment is particularly desirable before incorporating the grass in the large amount of molasses.

A relatively minor amount, less than 20%, of the grass in finely divided form is dispersed in a large amount of blackstrap molasses so that the molasses constitutes the aqueous continuous phase and the alfalfa the disperse phase.

The molasses insoluble vitamin content of the grass dispersed in a major amount of the molasses is substantially stabilized against deterioration and the vitamin content is retained over long periods of time. It is desirable for a sufficient quantity of molasses to be present and for the molasses to be in sufficiently concentrated form so that there is no substantial change in the constitution of the molasses containing the grass dispersed therein.

In addition to dispersing alfalfa in the blackstrap molasses, the vitamin containing and molasses or water insoluble and oil soluble extracts of the alfalfa or other similar legume or cereal grass may similarly be dispersed therein.

For example, vitamin containing extracts of alfalfa which are substantially insoluble in molasses or water may be removed from the alfalfa and such extracts may then be homogenized or thoroughly dispersed in the blackstrap molasses so that the extract constitutes the disperse phase and the molasses the aqueous continuous phase, and utilizing a very small proportion of the extract such as between about 0.1% and 10% to 20% against the weight of the molasses.

In addition to retarding loss of carotene or pro-vitamin A, loss of vitamin C is also retarded.

The final molasses emulsion or dispersion desirably contains at least about 60% to 65% total solids.

It has been found undesirable to mix this molasses emulsion or dispersion with other materials such as with flours, fish meal, yeast wastes or other similar materials.

If, however, the molasses dispersion is mixed with such other materials, the mixture should be made immediately before final consumption.

Where it is necessary to add the molasses dispersion to these other materials, it is desirable for the molasses combination to first be put through a homogenizer or other similar grinding or finely mixing device, and then for this thorough molasses dispersion to be mixed in very slowly and without excessive agitation with the other materials. In this way there will be a minimum amount of the breaking up of the emulsion or dispersion and the intimate combination of the molasses with the germ or grass will be retained in the finished product, the retention of which dispersion is essential in order to obtain the fully desirable results of the present invention.

There may also be utilized in accordance with the present invention the highly active antioxygenic extracts removed from blackstrap molasses, and particularly by the use of an alcohol solvent. For example, blackstrap molasses may be extracted by the use of methyl alcohol, ethyl alcohol, propyl alcohol or butyl alcohol, and the extract thus obtained, after removal of the solvent therefrom, may be utilized in accordance with the present invention and has marked antioxygenic action. Preferably, the molasses is first dehydrated to substantial dryness before extraction in order to facilitate removal of the potent antioxygenic materials contained in the molasses.

Together with or in lieu of the blackstrap molasses there may also be employed the substantially concentrated sulphurous acid extract of corn prepared by extracting corn at a pH of between about 3 and 4.5, at a temperature between about 105° F. and 120° F. and for a period of 18 to 45 hours. After the soaking of the corn, the acidified water is drained away. The water solution may then be vacuum concentrated to about 70% total solids and incidental to the vacuum concentration the pH may be neutralized to between about 5 and 6.9 and the extract filtered. The extract thus obtained will contain between about 25% and 40% total nitrogenous material determined as protein. The concentrated corn extract thus obtained and containing between about 65% and 85% total solids may be used as the aqueous continuous phase and for the dispersion of the germ or grass therein, whereby substantial stabilization of the germ or grass and particularly of the water insoluble oxidizable materials contained therein is obtained.

Together with or in lieu of the molasses, there may less preferably be employed aqueous dispersions of spent yeast and yeast waste.

The present application is a continuation in part of applications, Serial No. 249,166 filed January 3, 1939, now Patent No. 2,198,210, Serial No. 269,913 filed April 25, 1939, now Patent No. 2,198,214 and Serial No. 317,175 filed February 3, 1940, now Patent No. 2,198,218.

Having described my invention, what I claim is:

1. A method of stabilizing vitamin containing vegetative materials selected from the group consisting of cereal grasses, forage grasses, cereal germs and embryos and their oil soluble vitamin containing extracts which comprises dispersing a relatively minor amount of said materials in a major amount of molasses, the molasses occupying the continuous aqueous phase.

2. A method of stabilizing vitamin containing vegetative materials selected from the group consisting of cereal grasses, forage grasses, cereal germs and embryos and their oil soluble vitamin containing extracts which comprises dispersing a relatively minor amount of said materials in a major amount of molasses, the molasses occupying the continuous aqueous phase, and then heating to over 200° F. to obtain an enhanced stabilizing effect.

3. A method of stabilizing forage grasses which comprises dispersing a minor amount of said grasses in a major amount of blackstrap molasses.

4. A method of stabilizing alfalfa which comprises dispersing a minor amount of said alfalfa in a major amount of blackstrap molasses.

5. A method of stabilizing forage grasses which comprises dispersing a relatively minor amount of said grasses in a major amount of blackstrap molasses, the blackstrap molasses occupying the continuous aqueous phase, and then heating to over 200° F. to obtain an enhanced stabilizing effect.

6. A method of stabilizing dehydrated alfalfa which comprises dispersing a relatively minor amount of said alfalfa in a major amount of blackstrap molasses, the blackstrap molasses occupying the continuous aqueous phase, and then heating to over 200° F. to obtain an enhanced stabilizing effect.

7. A substantially stabilized composition comprising a dispersion of a minor amount of a vitamin containing vegetative material selected from the group consisting of cereal grasses, forage grasses, cereal germs and embryos and their oil soluble vitamin containing extracts in a major amount of molasses.

8. A substantially stabilized composition comprising a dispersion of a minor amount of a vitamin containing cereal grass in a major amount of blackstrap molasses.

9. A substantially stabilized composition comprising a dispersion of a minor amount of vitamin containing alfalfa in a major amount of blackstrap molasses.

10. A substantially stabilized composition comprising a dispersion of a minor amount of an oil soluble vitamin containing extract of a cereal grass in a major amount of molasses.

11. A substantially stabilized composition comprising a dispersion of a minor amount of an oil soluble vitamin containing extract of a forage grass in a major amount of molasses.

SIDNEY MUSHER.